United States Patent

[11] 3,591,856

[72] Inventor Jeffrey C. Kalb
San Jose, Calif.

[21] Appl. No. 681,281

[22] Filed Nov. 7, 1967

[45] Patented July 6, 1971

[73] Assignee Texas Instruments Incorporated
Dallas, Tex.

[54] J-K MASTER-SLAVE FLIP-FLOP
9 Claims, 5 Drawing Figs.

[52] U.S. Cl. .......... 307/247, 307/215, 307/269, 307/291

[51] Int. Cl. .......... H03k 17/00

[50] Field of Search .......... 307/247, 269, 215

[56] References Cited

UNITED STATES PATENTS

| | | | |
|---|---|---|---|
| RE26,082 | 9/1966 | Osborne .......... | 307/215 |
| 3,193,695 | 7/1965 | Monahan .......... | 307/247 |
| 3,229,119 | 1/1966 | Bohn .......... | 307/215 |
| 3,247,399 | 4/1966 | Moody .......... | 307/269 |
| 3,430,070 | 2/1969 | Marshall .......... | 307/247 |

*Primary Examiner*—Donald D. Forrer
*Assistant Examiner*—Harold A. Dixon
*Attorneys*—Samuel M. Mims, Jr., James O. Dixon, Andrew M. Hassell, Harold Levine, Melvin Sharp, John E. Vandigriff and James C. Fails

ABSTRACT: Disclosed is a J–K master-slave flip-flop system having a simplified gating system and in which no clock pulse connections are required for the transfer transistors. Clock pulses are fed to input gates. Additional clocks may be added by tying the input gates to clock lines. The clock pulse are ANDed together at the input gate so that the J–K master-slave flip-flop system is suitable for use in large arrays.

JEFFREY CLIFFORD KALB
INVENTOR

BY John E. Vandigriff
ATTORNEY

J-K MASTER-SLAVE FLIP-FLOP

The present invention relates to electrical flip-flop circuits and more particularly to J-K master-slave flip-flop circuits.

An object of the invention is to provide a J-K master-slave flip-flop with a minimum load upon the clock.

Another object of the invention is to provide a J-K master-slave flip-flop which is entirely free of internal race conditions.

Other objects, features and advantages of the invention will be best understood by reference to the following detailed description when read in conjunction with the appended claims and attached drawings in which like reference symbols indicate like parts and in which:

FIG. 5 illustrates the input-output transfer characteristics of the TTL NAND input-gates of the embodiment of FIG. 2.

Figure 1:
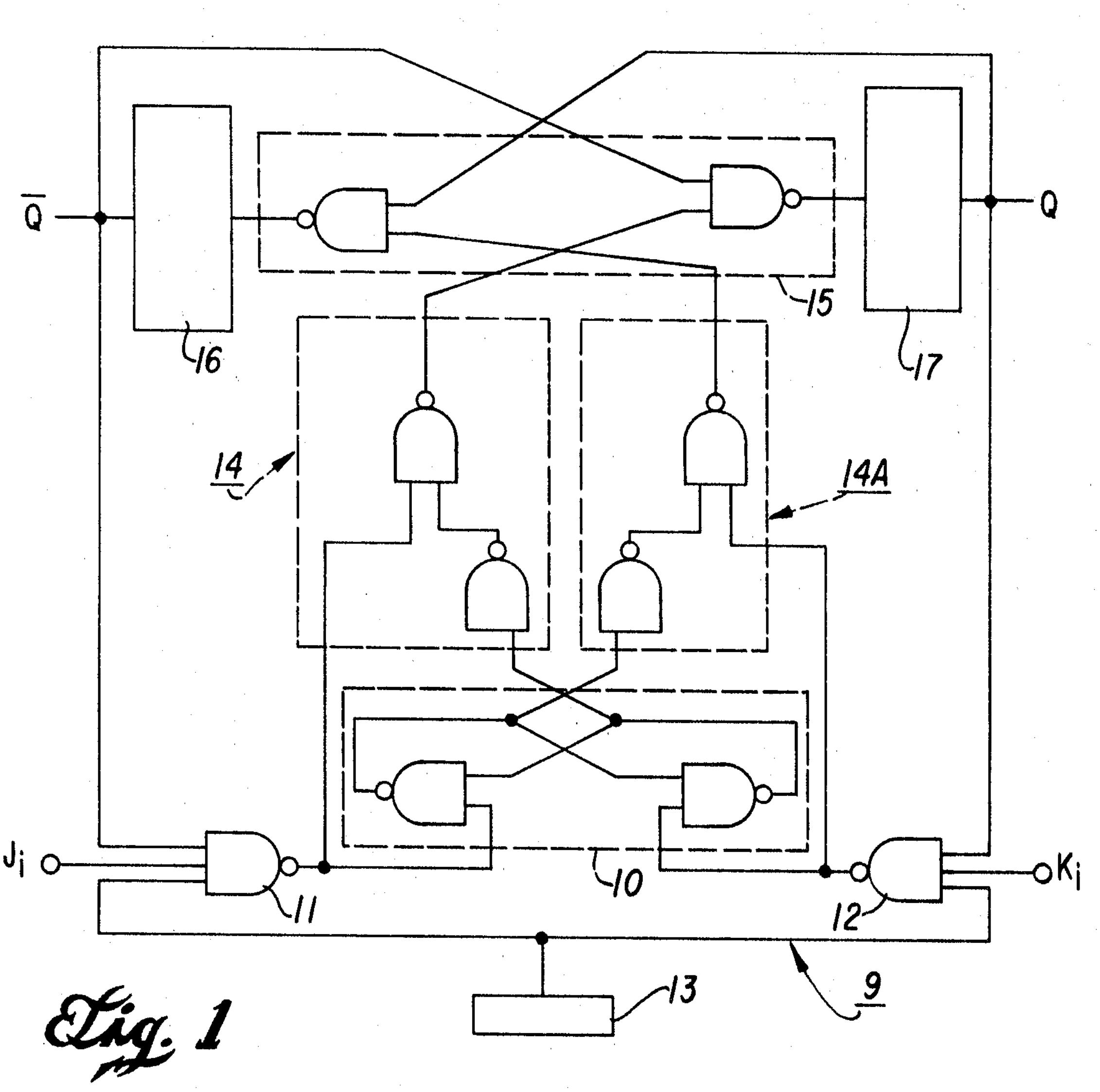
FIG. 1 illustrates a block diagram of a J-K master-slave flip-flop according to the present invention.

Referring to FIG. 1, a block diagram of a J-K master-slave flip-flop according to the present invention is illustrated and indicated by reference No. 9. Input information is received through the $J_i$-$K_i$ inputs to the input gages 11 and 12. A clock pulse from the clock 13 and an output feedback from each of the output circuits 16 and 17 are also received at the two input gates 11 and 12. Information is entered from the $J_i$—$K_i$ inputs to the master flip-flop 10 when the clock pulse goes high, that is when the positive edge of the clock pulse occurs. The information stored in the master flip-flop 10 is then transferred through the transfer gates 14 and 14A to the slave flip-flop 15 when the clock pulse goes low, that is, when the negative edge of the clock pulse occurs. The state of the slave flip-flop appears at the outputs Q and $\overline{Q}$ as binary high-low voltage level outputs from the output circuits 16 and 17.

The clear and preset controls (shown in FIG. 2) allow the J-K master slave flip-flops 10 and 15 to be set to either state, Q=1 and Q=$\overline{0}$, or Q=0 and $\overline{Q}$=1. The input-output logic table for the J-K master slave flip-flop 9 is shown in Table I below:

TABLE I

| | | Initial output | | Final output [1] | |
|---|---|---|---|---|---|
| J | K | Q | $\overline{Q}$ | Q | $\overline{Q}$ |
| 1 | 1 | 1 | 0 | 0 | 1 |
| 1 | 1 | 0 | 1 | 1 | 0 |
| 1 | 0 | 1 | 0 | 1 | 0 |
| 1 | 0 | 0 | 1 | 1 | 0 |
| 0 | 1 | 1 | 0 | 0 | 1 |
| 0 | 1 | 0 | 1 | 0 | 1 |
| 0 | 0 | 1 | 0 | 1 | 0 |
| 0 | 0 | 0 | 1 | 0 | 1 |

[1] Compliments initial output.

It is to be noted that in the logic shown in Table I, the logic state 1 is to be represented by a high voltage and the logic state 0 is to be represented by a low voltage.

Figure 2:
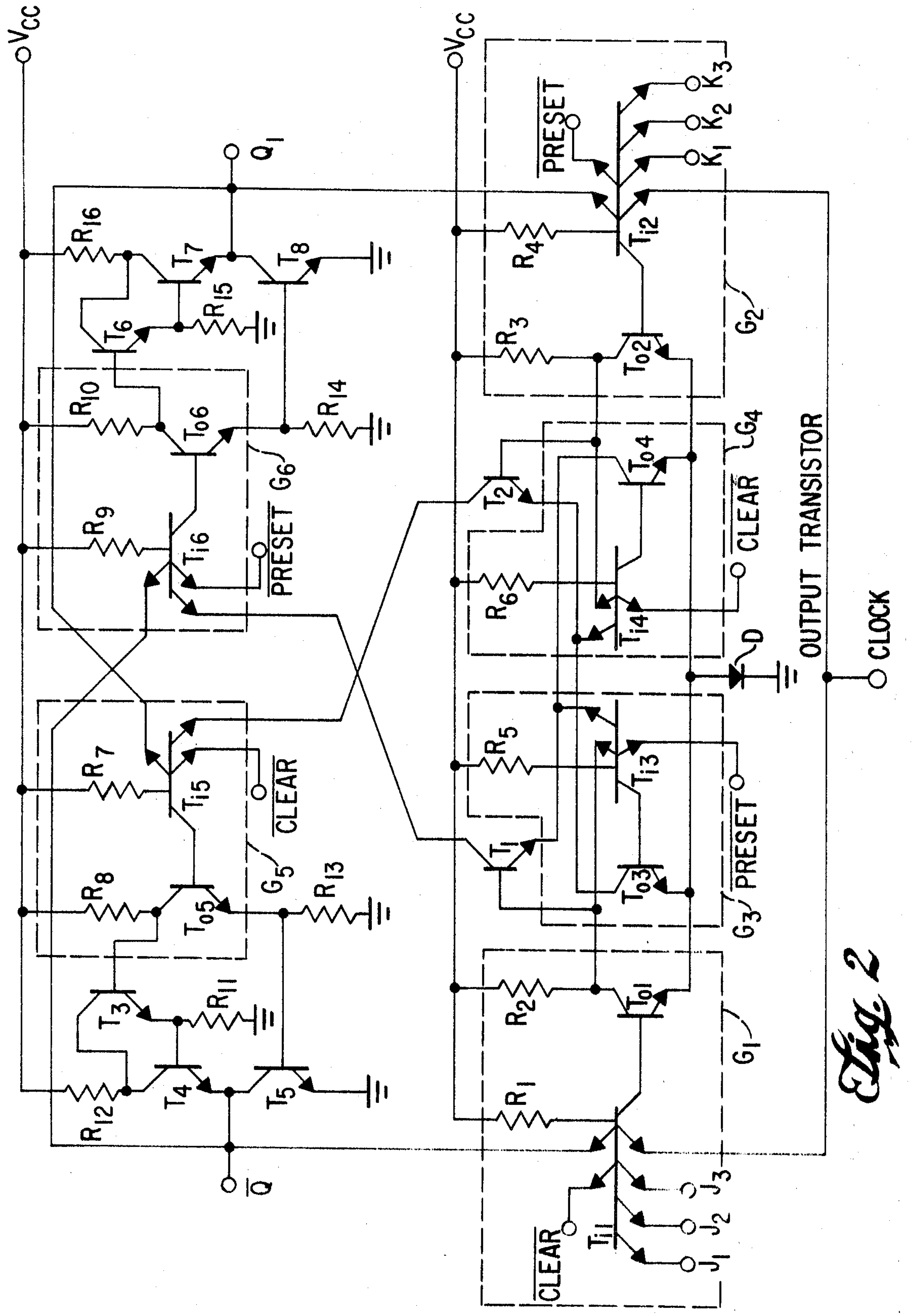
FIG. 2 illustrates embodiment of a J-K master-slave flip-flop according to the invention.

Referring to FIG. 2, a J-K master slave flip-flop designed according to the present invention is illustrated. The master slave flip-flop is comprised of six TTL NAND gates, $G_1$—$G_6$, two transfer transistors $T_1$ and $T_2$, six output transistors $T_3$—$T_8$, sixteen resistors $R_1$—$R_{16}$, one reference diode D, and two biasing voltages $Vcc_1$ and $Vcc_2$. The gates $G_1$ and $G_2$ and resistors $R_1$—$R_4$ comprise the two input gates for the master slave flip-flop. The gates $G_3$ and $G_4$ and resistors $R_5$ and $R_6$ comprise the master flip-flop which is set in accordance with the J—K inputs to gates $G_1$ and $G_2$ when the positive edge of the clock pulse occurs. Gates $G_1$—$G_4$ are connected to ground through the reference diode D. Transistors $T_1$ and $T_2$ comprise the transfer gates 14 and 14A of FIG. 1 respectively. They are the means of information transfer between the master flip-flop 10 and the slave flip-flop 15. $T_1$ and $T_2$ isolate the master flip-flop 10 from the slave flip-flop 15 while the master flip-flop 10 is being set at the positive edge of a clock pulse and transfers the information from the master flip-flop 10 to the slave flip-flop 15 at the negative edge of the clock pulse.

Gates $G_5$ and $G_6$ and resistors $R_7$—$R_{10}$ comprise the slave flip-flop 15 which is set in accordance with the information received from the master flip-flop through transistors $T_1$ and $T_2$ at the negative edge of the clock pulse. Transistors $T_3$—$T_8$ and resistors $R_{11}$—$R_{16}$ comprise output circuitry 16 and 17 which provides the J-K master slave flip-flop with low output impedance, low noise pickup and good capacitive drive characteristics. The binary output of the master slave flip-flop, Q and $\overline{Q}$, is taken from the output circuitry.

Figure 3:
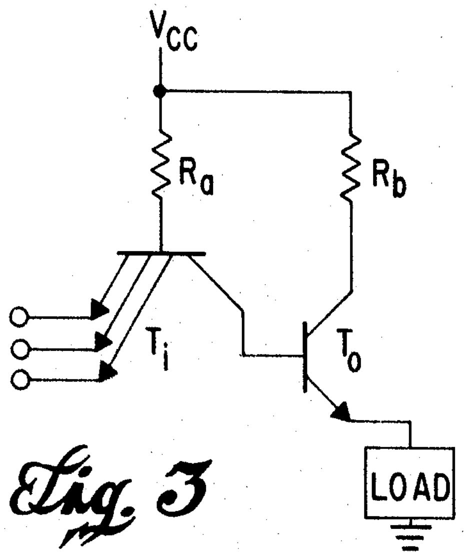
FIG. 3 illustrates a TTL NAND gate used in the embodiment of FIG. 2.

Referring to FIG. 3, each of the six TTL NAND gates shown in FIG. 2 comprises two NPN transistors $T_i$ and $T_o$ and biasing resistors $R_a$ and $R_b$. $T_i$ is a multiple emitter transistor and its several emitters comprise the inputs to the NAND gate. The base of $T_i$ is connected to the biasing voltage $V_{cc}$ through $R_a$ and the collector is connected to the base of the output transistor $T_o$. The collector of $T_o$ is connected to the biasing voltage $V_{cc}$ through $R_b$ and its emitter is connected to ground through the diode D (gates $G_1$—$G_4$) or through a passive resistance (gates $G_5$ and $G_6$).

The voltage states of the $T_i$ input emitters determine whether $T_o$ will be in the On or Off state as the current of transistors $T_i$ flows either through the base-collector P–N junction thereof or through one of the base-emitter P–N junctions. If the inputs to all emitters of $T_i$ are in the high state, the base-emitter P–N junctions will all be reverse biased and current will flow through the base-collector junction to the base of $T_o$, turning $T_o$ On. If one or more of the emitter inputs of $T_i$ are low, the respective base-emitter P–N junctions of such emitters will be forward biased and the current of transistor $T_i$ will be diverted from the collector to such emitters. In this state no drive current reaches the base of $T_o$ and $T_o$ is turned Off.

The input threshold voltage for a high input is determined by the voltage across the external circuitry Load plus the base-emitter voltage $V_{be}$ of output transistor $T_o$. Any input emitter voltage to $T_i$ below this level will forward bias the base-emitter junction of the emitter to which it is applied. When all $T_i$ emitters are high, the drive current to transistor $T_o$ is sufficient to saturate it, causing its collector voltage to go low. When no drive current reaches $T_o$, $T_o$ is Off and the collector is at the high voltage impressed upon it by $V_{cc}$. The output of the NAND gate is the voltage of the $T_o$ collector. It is to be noted that for the TTL NAND gate illustrated, the logical state 1 is represented by a high voltage and the logical state 0 is represented by a low voltage.

Transistors $T_1$ through $T_8$ (in FIG. 2) are NPN transistors with suitable saturation characteristics for digital circuitry use. Diode D is a P–N junction semiconductor diode.

The functional relationships between the components of the master-slave flip-flop may be best understood by reference to the operation of the flip-flop in response to a sample set of inputs while in a given initial output state. For purposes of this description, the assumed initial output state is Q in the logical 1 state and $\overline{Q}$ in the logical 0 state. The sample inputs are $J_1$ through $J_3$ in the logical 1 state, $K_1$ through $K_3$ in the logical 1 state, clear in the logical 1 state and preset in the logical 1 state. As seen from Table I above, after the clock pulse occurs, the output state will be Q in the 0 state and $\overline{Q}$ in the 1 state, the complement of the initial output state. As will become evident subsequently, for Q to be initially in the logical 1 state, that is at a high voltage, transistor $T_1$ must be On, transistor $T_2$ must be Off, gate $G_3$ must have a logical 1 output and gate $G_4$ must have a logical 0 output.

Figure 4:
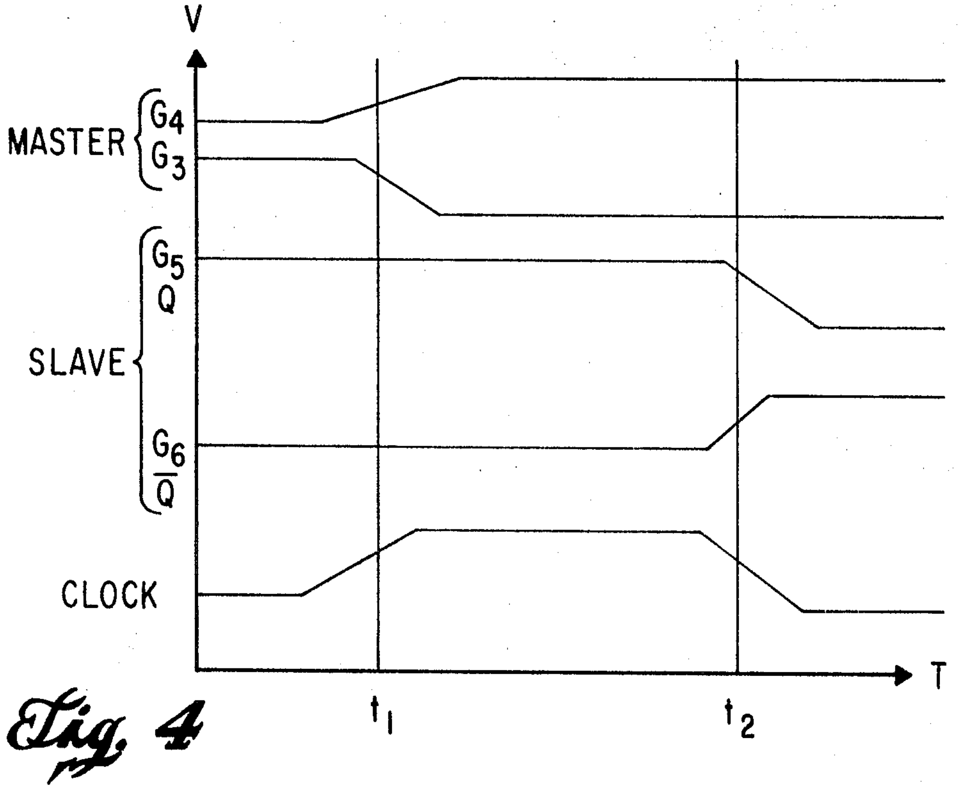
FIG. 4 illustrates a timing diagram of the operation of the embodiment of FIG. 2.

The timing diagram for the operation of the master-slave flip-flop under the conditions stated above is illustrated in FIG. 4 and will be referred to during the description of the flip-flop operation.

At time $t_1$ of FIG. 4, the J and K inputs and the positive edge of the clock pulse are all present at the input gates of the master-slave flip-flop. Referring to FIG. 2, gate $G_1$ has a low voltage logical 0 input from $\overline{Q}$, regardless of the clock and J inputs, forcing its output to the logical 1 state. It is thus disabled by $\overline{Q}$ and its logical output at the collector of transistor $T_{o1}$ does not change. Gate $G_2$, however, has all inputs in the logical 1 or high state. The base-collector junction of transistor $T_{i2}$ is thus forward biased and base current is fed to transistor $T_{o2}$. Transistor $T_{o2}$ begins to turn On in response to the base current it is now receiving. As transistor $T_{o2}$ turns On, the output voltage at its collector begins to drop. When the voltage becomes sufficiently low, the emitter of transistor $T_{i4}$, which is connected to the collector of transistor $T_{o2}$ will begin to draw the transistor current of $T_{i4}$ and transistor $T_{o4}$ will be turned Off. As $T_{o4}$ turns Off, its collector voltage rises. This voltage is connected to one of the emitter inputs of transistor $T_{i3}$. The other two emitter inputs of $T_{i3}$ are connected to the collector of transistor $T_{o1}$ and preset. Since these two inputs are in the logical 1 or high state, as $T_{o4}$ turns Off, all inputs to $T_{i3}$ reach the high state and $T_{o3}$ is turned On. Gate $G_3$ now has a logical 0 or low output and gate $G_4$ has a logical 1 or high output. The master flip-flop has been set in accordance with the J—K inputs.

Transistors $T_1$ and $T_2$ effectively isolate the master flip-flop from the slave flip-flop during this setting of the master flip-flop. As noted above, $T_1$ was On prior to the occurrence of the positive edge of the clock pulse. As $T_{o4}$ turns Off, however, the emitter of $T_1$ which is connected to the collector of $T_{o4}$ goes high and the base emitter junction of $T_1$ is reverse biased and $T_1$ turns Off, causing its collector to go high. This has no effect on the slave flip-flop since gate $G_{16}$ receives both the $\overline{Q}$ voltage and the $T_1$ collector voltage at its input emitters. Since $\overline{Q}$ remains low, the change in state of $T_1$ does not affect the gate $G_6$.

Before the clock pulse, transistor $T_2$ was Off and effectively open circuited at its emitter by transistor $T_{o3}$ which was then Off. Although $T_{o3}$ turned On when the positive edge of the clock pulse occurs, $T_2$ remains Off. For $T_2$ to turn On, its base voltage would have to reach the voltage $V_{be2}$ plus $V_{saturation\ 2}$ above the voltage of the reference diode D, where $V_{be2}$= the base-emitter forward diode voltage of $T_2$, and where $V_{saturation\ 2}$ = the base voltage required for $T_2$ to operate in the saturated region. However, the voltage to the base of $T_2$ is the output voltage of the collector of $T_{o2}$. This voltage has dropped low enough to turn transistor $T_{i4}$ On. Therefore, it must have gone below the voltage $V_{be4}-V_{offset\ 4}$ above the reference diode D, where $V_{be4}$= the base emitter junction voltage of transistor $T_{i4}$, and where $V_{offset\ 4}$ = the difference between the base-emitter forward diode voltage and the base-collector forward diode voltage of $T_{i4}$ above the reference diode D. So long as $V_{be2}+V_{saturation\ 2}$ is equal to or greater than $V_{be4}=V_{offset\ 4}$, the base voltage into transistor $T_2$ will have fallen below that required to turn On $T_2$ before $T_{o3}$ is turned On. The low emitter voltage $T_2$ receives as $T_{o3}$ turns On has no effect upon it and $T_2$ remains Off, preventing the setting of the master flip-flop from affecting the slave flip-flop. The difference in the two voltages $V_{be2}+V_{saturation\ 2}$ and $V_{be4}-V_{offset\ 4}$ insures the isolation of the master and slave flip-flops. The J–K master slave flip-flop 9 is free of any "internal race" conditions as the transfer transistors eliminate the possibility of signals being transferred between the master and slave flip-flops at improper times. Even if the two voltages are the same, propagation delay through gates $G_4$ and $G_3$ required before the emitter of of transistor $T_2$ goes low will prevent internal race. The same relationship that exists between transistors $T_2$, $T_{o2}$ and $T_{i4}$ also exist between transistors $T_1$, $T_{o1}$ and $T_{i3}$ to prevent internal race when the J—K inputs are such as to set the master flip-flop in the opposite sense to that described, causing the emitter of $T_1$ to go low. The collector of $T_{o1}$ will be below $V_{be1}+V_{saturation\ 1}$ ($V_{be1}$=base-emitter forward diode voltage of $T_1$ and $V_{saturation\ 1}$=the base voltage required for $T_1$ to operate in the saturated region) and $T_1$ will not be able to turn On.

The master flip-flop now contains the new information entered while the slave flip-flop contains the information entered previously. The transistors $T_1$ and $T_2$ isolate the two flip-flops.

At any time after the master flip-flop is set, the negative edge of a clock pulse may occur. In circuits built and tested, the time required for setting the master flip-flop has been as small as 7 nanoseconds. When the negative edge of the clock pulse occurs, gate $G_1$ remains unaffected due to the inhibiting effect of $\overline{Q}$ being low. However, with the clock now going low, the respective input emitter of $T_{i2}$ to the base of transistor $T_{o2}$ ceases, turning Off $T_{o2}$. As $T_{o2}$ turns Off, the output voltage at its collector rises. As the collector voltage rises, it reaches $V_{be2}-V_{aturation\ 2}$, the base voltage required for $T_2$ to turn On and $T_2$ turns On. The input emitter to transistor $T_{i5}$ connected to the collector of transistor $T_2$ is now connected to ground through $T_2$, $T_{o3}$ and the reference diode D. The input threshold for a high input to gate $G_5$ is set by the output transistor $T_5$ and resistors $R_8$ and $R_{13}$ to be above the voltage across $T_2$, $T_{o3}$ and reference diode D. The voltage to the emitter of $T_{i5}$ is thus sufficiently low to forward bias the respective base-emitter junction and the driving current from $T_{i5}$ to $T_{o5}$ ceases and transistor $T_{o5}$ turns Off. This turns Off transistor $T_5$ and turns On $T_3$ and $T_4$. The output biasing voltage $V_{cc2}$ now drives transistors $T_3$ and $T_4$ with the result that $\overline{Q}$ is high. At the same time, $T_{o4}$ is now Off and $T_1$ is essentially open circuited. The Q, $T_1$ and preset inputs to gate $G_6$ are now all high, with the result that $T_{o6}$ is turned On and the collector voltage of $T_{o6}$ goes low. Transistor $T_8$ is thus turned On and turns Off transistors $T_6$ and $T_7$, with the result that Q goes low. The transfer of information from the master flip-flop to the slave flip-flop and output circuits has been accomplished and the outputs now are Q low or 0 and $\overline{Q}$ high or 1, as required by the logic of the j–K master slave flip-flop as given in Table I.

It can now be seen that when Q was in the initial high state, gate $G_6$ must have been receiving a low input from $T_1$, and gate $G_5$ must have been receiving a high input from $T_2$, that is, $T_1$ was On and $T_2$ was Off. For $T_1$ to be On, the output of gate $G_4$ had to be low, and for $T_2$ to be Off, the output of gate $G_3$ had to be high. This is the justification for the assumption of $T_1$ On, $T_2$ Off, and $G_3$ high, $G_4$ low, as the initial state of the flip-flop in the above description.

The operation of the J–K master slave flip-flop in response to the other possible combinations of input signals and to the clear and preset signals is similar to that described above. It is to be noted that if Q is to be initially low, gate $G_2$ is disabled and gate $G_1$ is enabled, whereas if $\overline{Q}$ is initially low, gate $G_1$ is disabled and gate $G_2$ is enabled. No change of output state will occur unless an enabled input gate receives all logical 1 inputs. Special reference is made to the clear and preset signals. The preset signal is received at gates $G_2$, $G_3$ and $G_6$ and results in setting the master and slave flip-flops simultaneously so that Q is set to the logical 1 state and $\overline{Q}$ is set to the logical 0 state. The clear signal is received at gates $G_1$, $G_4$ and $G_5$, and results in the simultaneous setting of the master and slave flip-flops so that Q is set to the logical 0 state and $\overline{Q}$ is set to the logical 1 state. The present and clear signals are normally in the high or logical 1 state, so as not to affect the action of the gates. To cause preset or clear to occur, the respective signal is made to go low, causing a base-emitter forward biasing to occur at each of the multiple emitter transistors to which it is applied and forcing a high output for that gate.

Interconnecting the transfer transistors $T_1$ and $T_2$ with the input gates, $G_1$ and $G_2$, the master flip-flop gates $G_3$ and $G_4$ and the slave flip-flop gates $G_5$ and $G_6$ in the configuration illustrated in FIG. 2 provides many advantages for the J–K master slave flip-flop.

The J–K master-slave flip-flop requires no clock pulse connections to the transfer transistors. The clock pulse line is connected only to the input gates $G_1$ and $G_2$. This makes for a minimum power load upon the clock, a definite advantage in large arrays of flip-flops. With the clock being fed only to the input gates, more clocks can be added by simply tying the input emitter leads of the input gates to the clock lines. The clock pulses will then be ANDed at the input gates. This is especially desirable where the J–K master-slave flip-flop is embodied in an integrated circuit and additional connections to the transfer gates cannot be made after fabrication.

The transfer transistors $T_1$ and $T_2$ connected in the configuration shown also provide the isolation between the master flip-flop 10 and the slave flip-flop 15 during the time that the master flip-flop 10 is being set and until the negative edge of the clock pulse occurs. The configuration uses the inherent junction voltages of the transistors in the gates $G_1$—$G_4$ and the junction voltages and saturation voltages of the transfer transistors $T_1$ and $T_2$ to obtain total elimination of internal race conditions with a minimum of circuit components.

Because of this complete elimination of internal race conditions and the ANDing of the input signals at the input gates $G_1$ and $G_2$, the J–K master-slave flip-flop according to the present invention is especially suitable for use in large arrays where several clock lines may be required to supply clock pulses to many J–K master slave flip-flops. Due to propagation delays and other inequalities in clock lines and clock flip-flops, clock skew, a slight time staggering of the clock pulses, occurs. The J–K master slave flip-flop according to the present invention is relatively insensitive to such clock skew. So long as one input to both gates is low, no change in state of the master slave flip-flop may occur. Thus, if the J–K inputs arrive at the input gates before the clock pulse arrives, no change in state occurs until the clock pulse arrives.

During the times when the clock pulse is low, the J–K inputs may change states and have no effect upon the J–K master slave flip-flop 10. The only requirement for proper operation of the flip-flop 10 is that during the time when the clock pulse is high, the J–K inputs remain constant. Since the clock pulse can be as narrow as 7 nanoseconds, this is a very low requirement of stability.

Figure 5:
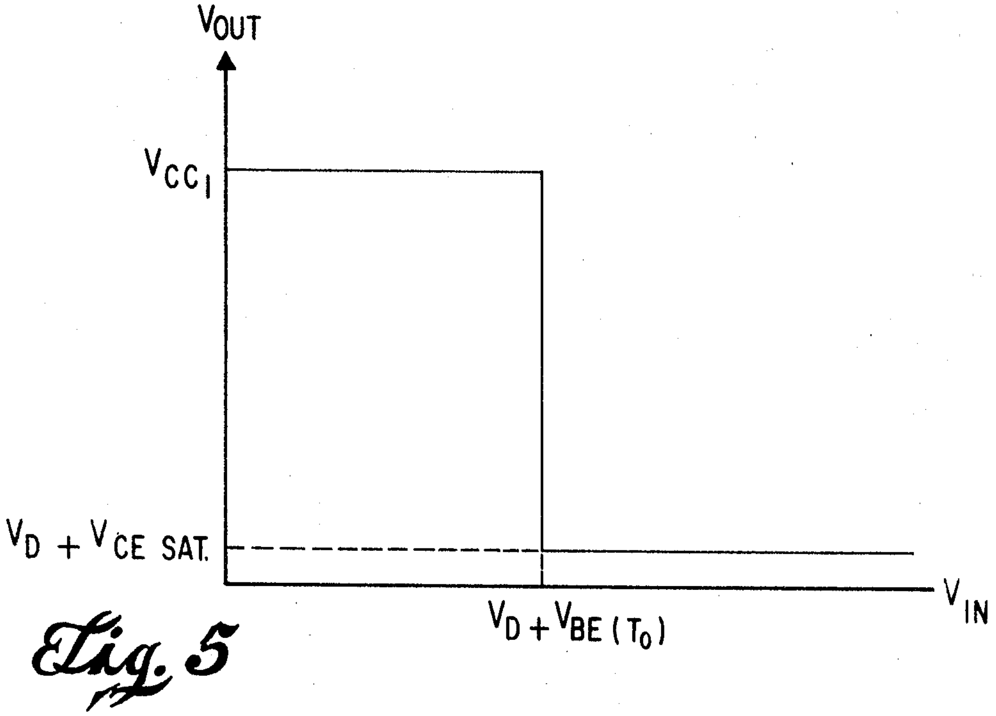
FIG. 5 illustrates a timing diagram of the operation of the embodiment of FIG. 2.

The reference diode D allows the input voltage threshold to the J–K master slave flip-flop to be set within a wide range of desired D–C levels. The threshold voltage for a high or logical 1 input is determined by the diode voltage of the reference diode D, plus the $V_{be}$ voltages of transistors $T_{o1}$, $T_{o2}$, $T_{i2}$ and $T_{i1}$. $T_{i1}$ or $T_{i2}$ will be at the voltage level $V_{diode}$–$V_{be}$ of $T_{o1}$ or $T_{o2}$. For a logical 1 or high input to occur, the input voltage must be above this voltage in order the base-collector diode of $T_{i1}$ or $T_{i2}$ to be forward biased. The reference diode D allows a high D–C threshold at the input to be maintained with a minimum of circuit components and as shown in FIG. 5, provides gates $G_1$—$G_4$ with a rectilinear transfer characteristic desirable in array applications.

It is to be understood that the above-described embodiments are merely illustrative of the invention. Other arrangements may be devised by those skilled in the art without departing from the spirit and scope of the invention.

I claim:

1. A master-slave flip-flop comprising in combination:

a. first and second multiple input gate circuits, each including at least one multiple emitter transistor, said first and second gate circuits being interconnected to form a master flip-flop having two output states;

b. third and fourth multiple input gate circuits, each including at least one multiple emitter transistor, said third and fourth gate circuits being interconnected to form a slave flip-flop having two output states;

c. first circuit means for interconnecting said master and said slave flip-flops; and d. second and third circuit means for respectively applying plural input signals and at least one clock signal to said first and second multiple input gate circuits, said input and clock signals having at least two conditions;

e. said master flip-flop includes means responsive to one condition of said input signals and one condition of said clock signal for changing the state of said master flip-flop, and said slave flip-flop includes means responsive to said master flip-flop and the other condition of said clock signal for changing the state of said slave flip-flop after said master flip-flop changes state.

2. A master-slave flip-flop in accordance with claim 1 wherein said first circuit means includes two transistors for respectively coupling the outputs of said master flip-flop to the inputs of said slave flip-flop.

3. A master-slave flip-flop in accordance with claim 1, wherein each of said second and third circuit means includes at least one multiple emitter transistor.

4. A master-slave flip-flop in accordance with claim 1 and further including fourth circuit means for applying clear and preset signals to said master and said slave flip-flops, whereby the states of said master and slave flip-flops are selectively changed in response to said clear and present signals.

5. A master-slave flip-flop in accordance with claim 1 wherein said first, second, third and fourth multiple input gate circuits are inverting gate circuits.

6. A master-slave flip-flop in accordance with claim 5 wherein said J–K signals and clock signals are selectively coupled to said master flip-flop by fifth and sixth NAND gates, with each of said NAND gates having at least one multiple emitter transistor.

7. A master slave flip-flop comprising in combination:

a. a master flip-flop comprising first and second interconnected NAND gates with each of said NAND gates having at least one multiple emitter transistor, said master flip-flop having two output states;

b. a slave flip-flop comprising third and fourth interconnected NAND gates, with each of said NAND gates having at least one multiple emitter transistor, said slave flip-flop having two output states;

c. circuit means for interconnecting said master and said slave flip-flops, said circuit means being responsive to J–K signals and clock signals, with each of said signals having at least a high and a low level d. the output state of said master flip-flop includes means responsive to one of said J–K signals and the high level of said clock signal for changing the state of said master flip-flop, and said slave flip-flop includes means responsive to said master flip-flop and the low level of said clock signal for changing the state of said slave flip-flop after said master flip-flop changes state.

8. A master-slave flip-flop in accordance with claim 7 wherein said circuit means include first and second transistors for respectively coupling the outputs of said master flip-flop to the inputs of said slave flip-flop.

9. A master-slave flip-flop system comprising in combination:

a. a master flip-flop circuit having cross-coupled multiple emitter transistors, said master flip-flop having two output states;

b. a slave flip-flop circuit having cross-coupled multiple emitter transistors, said slave flip-flop circuit having two output states;

c. first and second transfer gate circuits respectively coupled between the output of said master flip-flop and the input of said slave flip-flop; and d. first and second multiple input gate circuits for respectively applying plural input signals and at least one clock signal to the input of said master flip-flop, each of said input gate circuits including at least one multiple emitter transistor and said input and clock signals have at least two conditions; wherein e. said input signals are selectively applied to said first and second multiple input gate circuits and said clock signal is applied to said master flip-flop; and f. said master flip-flop includes means responsive to one condition of said input signals and one condition of said clock signal for changing the state of said master flip-flop, and said slave flip-flop includes means responsive to said master flip-flop and the other condition of said clock signal for changing the state of said slave flip-flop after said master flip-flop changes state.